United States Patent [19]

Ito et al.

[11] 4,358,936

[45] Nov. 16, 1982

[54] ELECTRIC CONTROL METHOD AND APPARATUS FOR AIR CONDITIONERS

[75] Inventors: Yoji Ito, Kariya; Yozo Inoue, Chiryu; Kiyoshi Hara, Kariya, all of Japan

[73] Assignee: Nippondenso Co., Ltd., Kariya, Japan

[21] Appl. No.: 191,814

[22] Filed: Sep. 26, 1980

[30] Foreign Application Priority Data

Oct. 1, 1979 [JP]  Japan ................................. 54-126962

[51] Int. Cl.³ ............................. F25B 1/00; B60H 3/00
[52] U.S. Cl. ...................................... 62/229; 62/323.4; 165/43
[58] Field of Search ....................... 62/229, 157, 323.4; 236/46 R; 165/42, 43

[56] References Cited

U.S. PATENT DOCUMENTS 2,746,261  5/1956  Gibson .............................. 62/229 X
3,576,420  4/1971  Iceland et al. ................. 219/121 EB

*Primary Examiner*—Albert J. Makay
*Assistant Examiner*—Harry Tanner
*Attorney, Agent, or Firm*—Cushman, Darby & Cushman

[57] ABSTRACT

In control of the cooling ability of an automobile air conditioner, an electric control method comprises the steps of detecting a deviation between the actual in-car temperature and a desired value upon each lapse of a predetermined period of time, comparing the detected deviation with a predetermined value and maintaining the cooling ability of the air conditioner when the detected deviation is larger than the predetermined value, comparing the detected deviation with the preceding detected deviation when the detected deviation is smaller than or equal to the predetermined value and maintaining the cooling ability of the air conditioner when the detected deviation is larger than or equal to the preceding detected deviation, decreasing the cooling ability of the air conditioner when the detected deviation is smaller than the preceding detected deviation, and increasing the cooling ability of the air conditioner when the detected deviation is larger than each of the predetermined value and the preceding detected deviation, thereby to reduce unnecessary engine power torque losses caused by operation of the air conditioner.

8 Claims, 5 Drawing Figures

ELECTRIC CONTROL METHOD AND APPARATUS FOR AIR CONDITIONERS

BACKGROUND OF THE INVENTION

The present invention relates to control of air conditioners, and more particularly to an electric control method and apparatus for an automobile air conditioner for controlling the cooling ability of the air conditioner to possibly reduce the power losses of a prime engine of the automobile.

In a conventional automobile air conditioner, a compressor is driven by the prime engine to compress refrigerant medium supplied into an evaporator so as to cool the air flowing into a passenger compartment to be conditioned. The compressor is equipped with an electromagnetic clutch mechanism which is arranged to be deactivated under the condition where the outside ambient temperature is below a predetermined value (for instance, approximately 15° C.) or an air-blend door is maintained in a position to cut-off the cooled air flowing into the passenger compartment from the evaporator. This serves to reduce unnecessary torque losses of the prime engine. In this control of the compressor, even if the actual in-car temperature is adjusted to a desired value, the electromagnetic clutch mechanism may not be deactivated in spite of the condition noted above. As a result, effective control of the compressor may not be conducted in accordance with adjustment of the actual in-car temperature, causing still unnecessary power torque losses of the prime engine.

SUMMARY OF THE INVENTION

It is, therefore, the primary object of the present invention to provide an improved electric control method and apparatus for an automobile air conditioner capable of effectively decreasing the cooling ability of the air conditioner when the actual in-car temperature approaches to a desired low value and directed to the same.

Another object of the present invention is to provide an improved electric control method and apparatus for an automobile air conditioner capable of adjusting the actual in-car temperature to a desired low value as precisely as possible without unnecessary power losses of the prime engine.

According to the present invention briefly summarized, the above objects are accomplished by provision of an electric control method for controlling the cooling ability of cooling means in an automobile air conditioner to direct the actual in-car temperature in a passenger compartment toward a desired value, the control method comprising the steps of:

detecting a deviation between the actual in-car temperature and the desired value upon each lapse of a predetermined period of time;

comparing the detected deviation with a predetermined value and maintaining the cooling ability of the cooling means when the detected deviation is larger than the predetermined value;

comparing the detected deviation with the preceding detected deviation when the detected deviation is smaller than or equal to the predetermined value and maintaining the cooling ability of the cooling means when the desired deviation is larger than or equal to the preceding detected deviation;

decreasing the cooling ability of the cooling means when the detected deviation is smaller than the preceding detected deviation; and increasing the cooling ability of the cooling means when the detected deviation is larger than each of the predetermined value and the preceding detected deviation.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
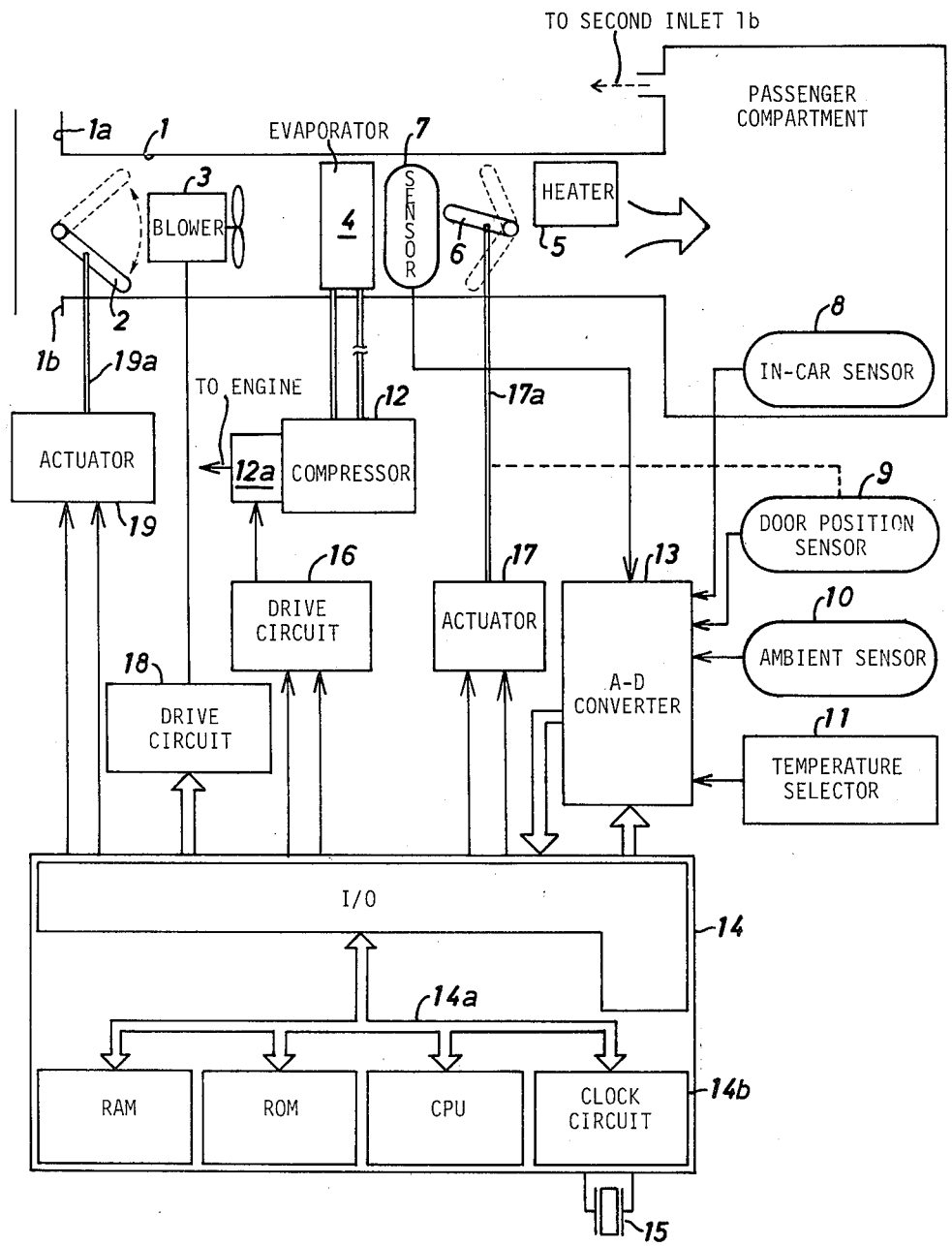
FIG. 1 is a schematic block diagram of an electric control apparatus in accordance with the present invention adapted to an automobile air conditioner.

Referring now to FIG. 1 of the drawings, there is schematically illustrated an electric control apparatus in accordance with the present invention which is adapted to an automobile air conditioner. The air conditioner comprises an air duct 1 which is provided therein with a switch door 2, a blower 3 and an evaporator 4. The switch door 2 is switched over to selectively open first and second inlets 1a, 1b of air duct 1, as shown by solid and dotted lines in FIG. 1. When the first inlet 1a is opened, the air to be conditioned is taken from outside the automobile into the air duct 1. When the second inlet 1b is opened, the air to be conditioned is taken from inside a passenger compartment of the automobile into the air duct 1. The blower 3 is driven to impel the air from one of the first and second inlets 1a, 1b toward the evaporator 4.

The evaporator 4 serves to receive the air from blower 3 in such a manner that refrigerant liquid in evaporator 4 is evaporated by heat of the air to extract heat from the air. The heat-extracted or cooled air is applied by the evaporator 4 to an air-blend door 6 and a heater 5, whereas the evaporated liquid is circulated into a refrigerant compressor 12 as refrigerant gases. The compressor 12 includes an electromagnetic clutch mechanism 12a which is coupled to an engine for the automobile by a belt (not shown). The clutch mechanism 12a is selectively energized to connect the compressor 12 with the automobile engine. When the compressor 12 is driven by the engine, the refrigerant gases are compressed by the compressor 12 into high-pressurized gas and condensed by a condenser (not shown) into high-pressurized refrigerant liquid. The refrigerant liquid from the condenser is changed by an expansion valve (not shown) into low-pressurized liquid with low temperature to be circulated into the evaporator 4. The heater 5 is provided within the air duct 1 and cooperable with an engine coolant system (not shown) to partly warm the cooled air from evaporator 4. The air-blend door 6 is also provided within the air duct 1 to adjust the proportion of the cooled air flowing from evaporator 4 into the passenger compartment and the warmed air from the heater 5 flowing into the passenger compartment.

The electric control apparatus comprises an analog-to-digital or A–D converter 13 which is connected to various sensors 7 to 10 and an in-car temperature selector 11. The temperature sensor 7 is located at the downstream of evaporator 4 such that it detects the actual temperature $T_c$ of air from evaporator 4 to produce an analog signal with a level corresponding to the actual temperature $T_c$. The in-car sensor 8 is provided within the passenger compartment and detects the actual temperature $T_r$ of air in the compartment to produce an analog signal with a level corresponding to the actual in-car temperature $T_r$. The door position sensor 9 is in the form of a potentiometer which is coupled by a control rod 17a to the air-blend door 6. The sensor 9 detects the actual displacement of rod 17a to produce an analog signal with a level corresponding to the actual opening angle $T_{po}$ of air-blend door 6. The analog signals from sensors 7 to 9 are sequentially converted by the A–D converter 13 into binary signals respectively indicating the actual temperatures $T_c$ and $T_r$ and the actual door opening angle $T_{po}$.

The outside ambient sensor 10 is located adjacent a grill for a radiator of the automobile to detect the actual ambient temperature $T_{am}$ outside the automobile, the sensor 10 producing an analog signal with a level corresponding to the actual ambient temperature $T_{am}$. The temperature selector 11 is assembled on an instrument panel in the passenger compartment such that it is manipulated to select a desired temperature $T_s$ of air in the passenger compartment and to produce an analog signal with a level corresponding to the desired or selected in-car temperature $T_s$. The analog signals from the sensor 10 and the selector 11 are sequentially converted by the A–D converter 13 into binary signals respectively indicating the actual ambient temperature $T_{am}$ and the selected in-car temperature $T_s$.

The electric control apparatus also comprises a digital computer 14 in the form of a single chip LSI microcomputer which receives a constant voltage of five volts from a voltage stabilizer (not shown) to be ready for its operation. The voltage stabilizer is supplied with electric power from an automobile battery (not shown) upon actuation of a main switch (not shown) to produce the constant voltage. The main switch is provided on the instrument panel in the passenger compartment to be manually actuated by the operator. The microcomputer 14 comprises a central processing unit or CPU which is connected through a bus line 14a to an input-output device or I/O, a read only memory or ROM, and a random access memory or RAM. I/O receives the binary signals from A–D converter 13 upon request of CPU to store them in RAM temporarily. These stored binary signals are selectively read out from RAM and applied to CPU through bus line 14a. CPU is also connected through bus line 14a to a clock circuit 14b and serves to execute a predetermined program in accordance with clock signals from clock circuit 14b. The clock circuit 14b is cooperable with a crystal oscillator 15 to produce clock signals at a predetermined frequency (MHz).

The above-noted predetermined program is previously stored in ROM to be executed in the computer 14 as follows.

(1) CPU serves to temporarily set in RAM a timer data C indicative of a frequency at which each execution for controlling the air-blend door 6, the blower 3 and the switch door 2 is repetitively performed by CPU during a period of time of thirty seconds.

(2) CPU serves to calculate a first deviation $\Delta T_0$ from the following equation (1) in relation to the actual and selected in-car temperatures $T_r$ and $T_s$ read out from RAM.

$$\Delta T_0 = T_r - T_s \quad (1)$$

Thereafter, CPU discriminates whether or not the calculated first deviation $\Delta T_0$ is larger than or equal to a first predetermined value $\alpha$. The first predetermined value $\alpha$ is experimentally determined, for example, as 0.5° C. and stored previously in ROM. When the calculated first deviation $\Delta T_0$ is larger than or equal to the first predetermined value $\alpha$, CPU acts to generate a first output signal to be applied to a drive circuit 16. When the calculated first deviation $\Delta T_0$ is smaller than the first predetermined value $\alpha$, CPU also generates a second output signal to be applied to the drive circuit 16. This means that each of the first and second output signals from CPU is utilized for initial setting of the compressor 12 under control of the drive circuit 16.

(3) During each period of time of thirty seconds after the above generation of the first or second output signal, CPU serves to repetitively update the timer date C according to of the following equation (2) and to repetitively discriminate whether or not each of newly updated timer data C is equal to zero.

$$C = C - 1 \quad (2)$$

(4) Whenever the newly updated timer data C is not equal to zero, CPU acts to calculate an optimum opening angle $\theta$ of air-blend door 6 from the following equation (3) in relation to the selected and actual temperatures $T_s$, $T_r$, $T_{am}$ and $T_c$ read out from RAM and also in relation to a constant K and coefficients $K_s$, $K_r$, $K_{am}$ and $K_c$.

$$\theta = K_s \cdot T_s - (K_r \cdot T_r + K_{am} \cdot T_{am} + K_c \cdot T_c + K) \quad (3)$$

The constant K and the coefficients $K_r$, $K_{am}$ and $K_c$ are experimentally predetermined respectively in consideration with performance of the air conditioner and stored previously in ROM. The coefficient $K_s$ is also predetermined in consideration with performance of the air conditioner and stored previously in ROM.

Upon completing calculation of the optimum door opening angle $\theta$, CPU acts to calculate subtraction of the calculated optimum door opening angle $\theta$ from the product of a coefficient $K_{po}$ and the actual door opening angle $T_{po}$. The coefficient $K_{po}$ is experimentally predetermined in consideration with performance of the air conditioner and stored previously in ROM. When the product $K_{po} \cdot T_{po}$ is smaller than the calculated door opening angle $\theta$, CPU serves to produce a third output signal to be applied to an actuator 17. When the product $K_{po} \cdot T_{po}$ is larger than the calculated door opening angle $\theta$, CPU also produces a fourth output signal to be applied to the actuator 17. When the product $K_{po} \cdot T_{po}$ is equal to the calculated door opening angle $\theta$, CPU does not produce any of the third and fourth output signals.

Subsequently, CPU calculates a rotational speed $V_a$ of blower 3 from the following equation (4) in relation to a coefficient $K_{am}'$ and also in relation to the selected and actual temperatures $T_s$, $T_r$ and $T_{am}$ read out from RAM, CPU then producing a fifth output signal indicative of the calculated blower speed $V_a$.

$$V_a = f(|T_s - T_r|) + K_{am}' \cdot T_{am} \quad (4)$$

In the equation (4), it is experimentally observed that a function $f|(T_s-T_r|)$ is proportional to $|T_s-T_r|$ when $|T_s-T_r|$ is larger than or equal to a second predetermined value and takes a constant when $|T_s-T_r|$ is smaller than the second predetermined value. The second predetermined value is experimentally determined and stored previously in ROM. The coefficient $K_{am}'$ is also experimentally predetermined in consideration with performance of the air conditioner and stored previously in ROM.

Thereafter, CPU acts to discriminate whether or not the actual temperature $T_c$ is higher than or equal to a third predetermined value. The third predetermined value is experimentally determined and stored previously in ROM. When the actual temperature $T_c$ is lower than the third predetermined value, CPU acts to conduct generation of the second output signal and to produce a seventh output signal to be applied to an actuator 19. When the actual temperature $T_c$ is higher than or equal to the third predetermined value, CPU also discriminates whether or not the actual door opening angle $T_{po}$ is different from a reference angle defined by a fully closed position of air-blend door 6 at which the cooled air from evaporator 4 is fully blocked from the heater 5. The reference angle is experimentally predetermined and stored previously in ROM. When the actual door opening angle $T_{po}$ accords with the reference angle, CPU acts to conduct generation of each of the first and seventh output signals. When the actual door opening angle $T_{po}$ is different from the reference angle, CPU acts to produce a sixth output signal to be applied to the actuator 19.

(5) When one of the newly updated timer data C is equal to zero, CPU serves to calculate a second deviation $\Delta T$ from the following equation (5) in relation to the actual and selected temperatures $T_r$ and $T_s$.

$$\Delta T = T_r - T_s \quad (5)$$

Then, CPU discriminates as to whether or not the calculated second deviation $\Delta T$ is larger than or equal to zero. When the calculated second deviation $\Delta T$ is smaller than zero, CPU acts to set the calculated second deviation $\Delta T$ as a new first deviation $\Delta T_0$. When the calculated second deviation $\Delta T$ is larger than or equal to zero, CPU also acts to discriminate whether or not the calculated second deviation $\Delta T$ is smaller than or equal to a fourth predetermined value $\beta$. The fourth predetermined value $\beta$ is experimentally determined, for example, as 0.5° C. and stored previously in ROM. When the calculated second deviation $\Delta T$ is smaller than or equal to the fourth predetermined value $\beta$, CPU serves to discriminate whether or not the calculated second deviation $\Delta T$ is smaller than the calculated first deviation $\Delta T_0$. When the calculated second deviation $\Delta T$ is smaller than the calculated first deviation $\Delta T_0$, CPU acts to conduct generation of the second output signal and to set the calculated second deviation $\Delta T$ as a new first deviation $\Delta T_0$.

When the calculated second deviation $\Delta T$ is larger than the fourth predetermined value $\beta$, CPU acts to discriminate whether or not the calculated second deviation $\Delta T$ is larger than the calculated first deviation $\Delta T_0$. When the calculated second deviation $\Delta T$ is larger than the calculated first deviation $\Delta T_0$, CPU serves to conduct generation of the first output signal and to set the calculated second deviation $\Delta T$ as a new first deviation $\Delta T_0$. Setting of the calculated second deviation $\Delta T$ as a new first deviation $\Delta T_0$ is also conducted by CPU when the calculated second deviation $\Delta T$ is larger than each of the calculated first deviation $\Delta T_0$ and the fourth predetermined value $\beta$. This setting is further conducted by CPU when the calculated second deviation $\Delta T$ is larger than the calculated first deviation $\Delta T_0$ and smaller than or equal to the fourth predetermined value $\beta$. In practice of the present invention, a microcomputer of INTEL 8048 type manufactured by INTEL CORP. has been used as the computer 14 due to its commercial availability. Detail description regarding the microcomputer is eliminated because the particular construction and programming process are well known in prior arts.

The drive circuit 16 is arranged to receive the first output signal from I/O of computer 14 such that it produces an energization signal for energizing the clutch mechanism 12a. The drive circuit 16 also receives the second output signal from I/O of computer 14 to produce a deenergization signal for conducting deenergization of the clutch mechanism 12a. The actuator 17 is in the form of an electrically operated vacuum mechanism and provided therein with a drive circuit for producing first and second drive signals respectively upon receiving the third and fourth output signals from I/O of computer 14. The actuator 17 also includes a servomotor associated with the air-blend door 6 through the control rod 17a. The servomotor of actuator 17 is provided therein with a servo-chamber which is connected through a first solenoid valve to an engine intake manifold of the automobile. The servo-chamber of the servomotor is also connected through a second solenoid valve to the exterior.

When the first solenoid valve is opened in response to the first drive signal from the drive circuit, negative pressure from the engine intake manifold is applied to the servo-chamber of the servomotor such that the control rod 17a is downwardly displaced to increase the actual opening angle $T_{po}$ of air-blend door 6 toward an optimum value. When the second solenoid valve is opened in response to the second drive signal from the drive circuit, the atmospheric pressure from the exterior is applied to the servo-chamber such that the control rod 17a is upwardly displaced to decrease the actual door opening angle $T_{po}$ toward the optimum value. When each of the solenoid valves is closed upon disappearance of each drive signal from the drive circuit, the servomotor is isolated from the exterior and engine intake manifold to maintain the door opening angle in the optimum value.

The drive circuit 18 includes a digital-to-analog or D-A converter connected through a latch circuit to the computer 14, and a transistor circuit as an amplifier connected to the D-A converter. The fifth output signal indicative of the calculated blower speed $V_a$ from computer 14 is latched by the latch circuit and converted by the D-A converter into an analog signal with a level corresponding to the calculated blower speed $V_a$. The analog signal from the D-A converter is amplified by the transistor circuit as a drive signal for driving the blower 3. This means that the blower 3 is driven at a speed defined by the drive signal and acts to impel a quantity of air flow corresponding to the blower speed $V_a$ toward the evaporator 4.

The actuator 19 is in the form of an electrically operated vacuum mechanism and provided therein with a drive circuit for generating a drive signal upon receiving the sixth output signal from I/O of computer 14. The drive circuit serves to cease the generation of the drive signal in response to the seventh output signal from I/O of computer 14. The actuator 19 also includes a servomotor which is associated through a linkage rod 19a with the switch door 2 and provided therein with a servo-chamber connected through a solenoid valve to the exterior and the engine intake manifold. The solenoid valve is energized in response to the drive signal from the drive circuit to supply negative pressure from the engine intake manifold into the servo-chamber of the servomotor therethrough such that the linkage rod 19a is displaced downward to switch over the switch door 2 in the position shown by the solid line of FIG. 1. When the solenoid valve is deenergized in response to disappearance of the drive signal from the drive circuit, the atmospheric pressure from the exterior is supplied into the servo-chamber of the servomotor such that the linkage rod 19a is displaced upward to switch over the switch door 2 in the position shown by the dotted line of FIG. 1.

Hereinafter, operational modes of the electric control apparatus will be described in detail with reference to flow diagrams shown in FIGS. 2 to 5. When the main switch is actuated by the operator during travelling of the automobile, the electric control apparatus is conditioned in its operation such that the microcomputer 14 is supplied with the constant voltage from the voltage stabilizer to initiate execution of the predetermined program according to the flow diagram of FIG. 2.

Figure 2:
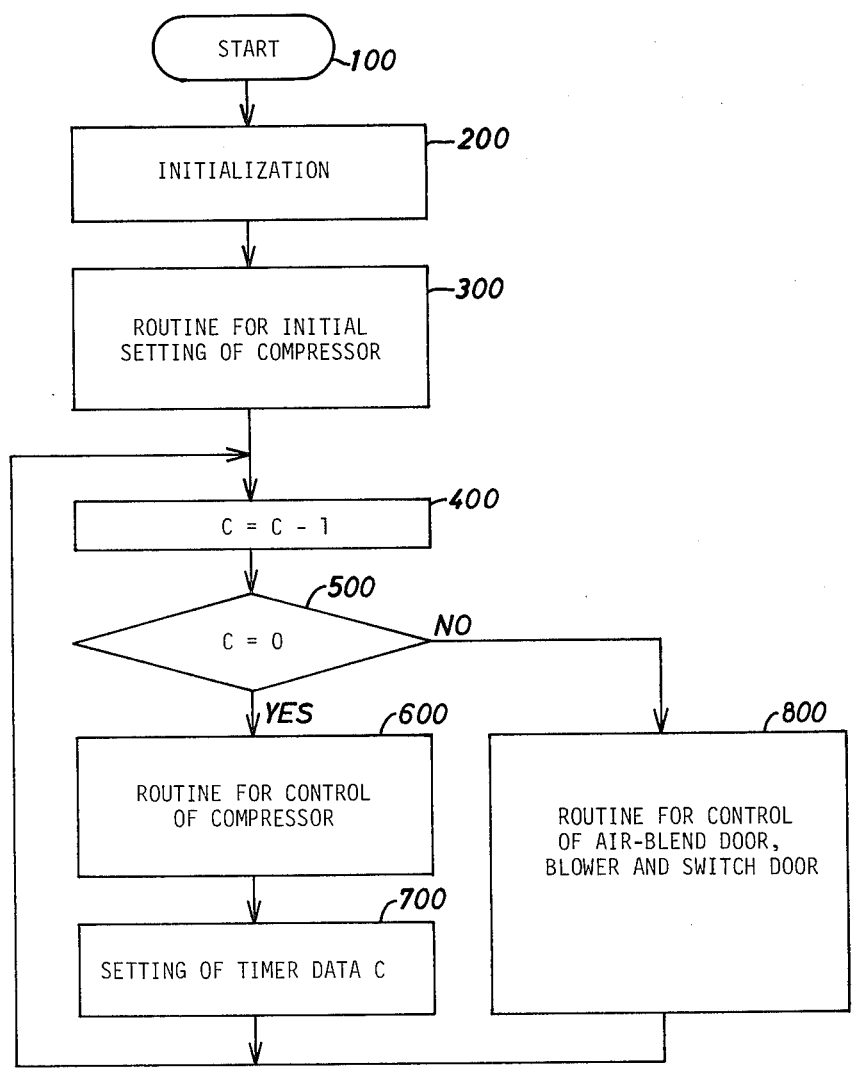
FIG. 2 is all the flow diagram illustrating operation of the digital computer shown in block form in FIG. 1.
Figure 3:
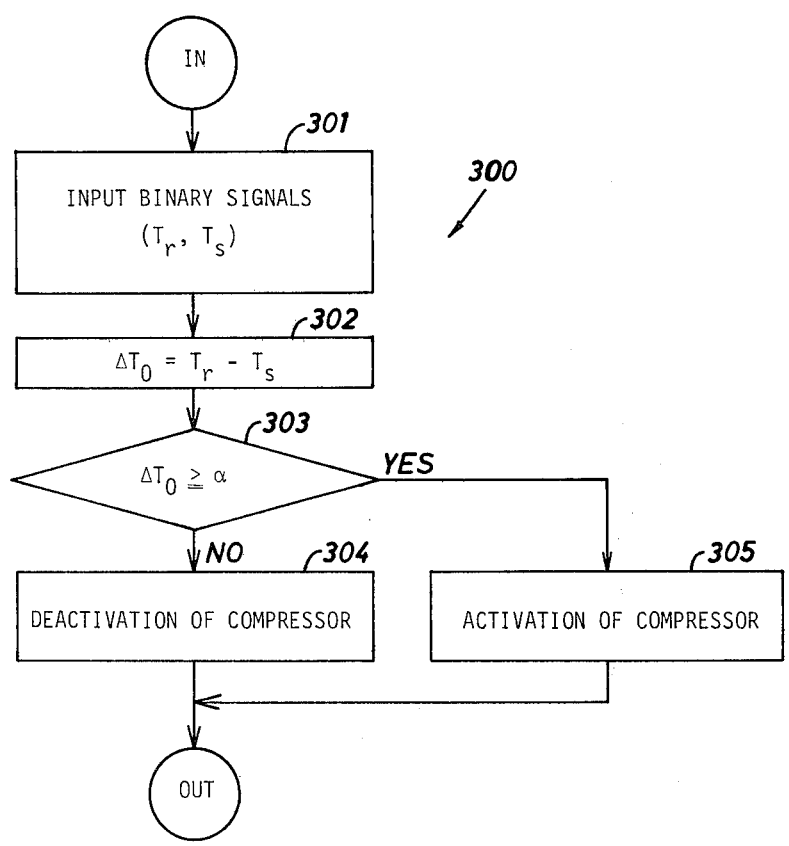
FIGS. 3 to 5 are detailed flow diagrams respectively illustrating the programming of the digital computer.

When the computer program proceeds to a point 200 through a point 100, various elements in the microcomputer 14 are initialized, and the timer data C is set in RAM, the program proceeding to a routine 300 for initial setting of the compressor 12, as shown in FIGS. 2 and 3. When the computer program proceeds to a point 301 of the routine 300, the actual in-car temperature $T_r$ detected by the in-car sensor 8 is applied to the A–D converter 13 as an analog signal, and a desired in-car temperature $T_s$ selected by the temperature selector 11 is also applied to the A–D converter 13 as an analog signal. These analog signals from the sensor 8 and selector 11 are sequentially converted by the A–D converter 13 into binary signals respectively indicating the actual and selected in-car temperatures $T_r$ and $T_s$. Then, these binary signals from A–D converter 13 are temporarily stored in RAM.

When CPU proceeds the computer program to a point 302, it calculates a first deviation $\Delta T_0$ from the equation (1) in relation to the actual and selected in-car temperatures $T_r$ and $T_s$ read out from RAM. Then, CPU discriminates at the following point 303 as to whether or not the calculated first deviation $\Delta T_0$ is larger than or equal to the first predetermined value $\beta$ read out from ROM. If CPU determines as "yes" at point 303, it acts to proceed the program to a point 305 so as to produce a first output signal. Then, the first output signal from CPU is applied through I/O to the drive circuit 16 which produces an energization signal to energize the clutch mechanism 12a of compressor 12. Thus, the compressor 12 is activated by the engine due to the energization of clutch mechanism 12a to compress refrigerant gases to be circulated into the evaporator 4 as low-pressurized liquid, as previously described. If CPU determines as "no" at the above point 303, it acts to proceed the program to a point 304 so as to produce a second output signal. Then, the second output signal from CPU is applied through I/O to the drive circuit 16 which produces a deenergization signal to maintain deenergization of the clutch mechanism 12a. Thus, the compressor 12 is maintained in its deactivation due to the deenergization of clutch mechanism 12a.

From the above description, it will be understood that in the initial setting routine 300, a first deviation $\Delta T_0$ is obtained as a difference between the actual and selected in-car temperatures $T_r$ and $T_s$ to maintain deactivation of compressor 12 when the first deviation $\Delta T_0$ is smaller than the first predetermined value $\beta$ and to activate the compressor 12 when the first deviation $\Delta T_0$ is larger than or equal to the first predetermined value $\beta$.

Figure 5:
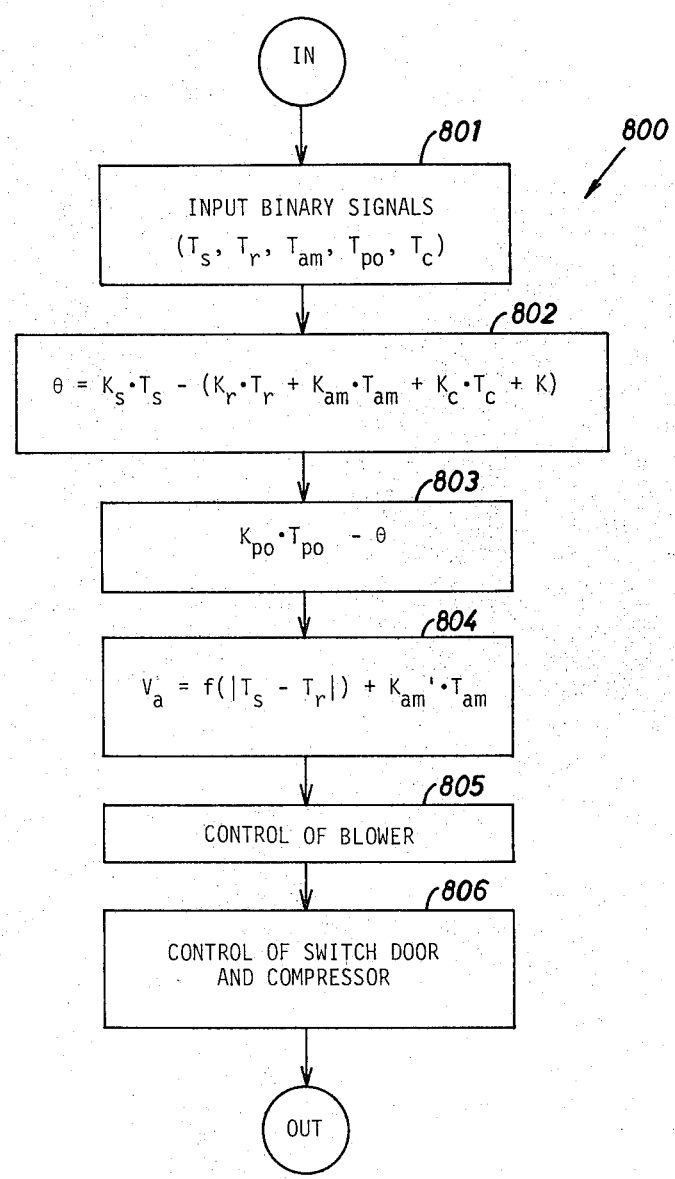

When the computer program proceeds to a point 400 from one of points 304, 305 of routine 300, CPU reads out the timer data C from RAM to update the same as a new one on a basis of the equation (2), the computer program then proceeding to the following point 500. At this point 500, CPU acts to discriminate whether the updated timer data C is zero or not. When CPU determines as "no" at point 500 because the updated timer data C is not yet zero, it proceeds the computer program to a routine 800 for each control of the air-blend door 6, the blower 3 and the switch door 2, as shown in FIGS. 2, 5.

When the computer program proceeds to a point 801 of the routine 800, the actual and selected in-car temperatures $T_r$ and $T_s$ from the sensor 8 and selector 11 are temporarily stored in RAM as binary signals respectively, as previously described. The actual ambient temperature $T_r$ detected by the ambient sensor 10 is applied to the A–D converter 13 as an analog signal, the actual door opening angle $T_{po}$ detected by the door position sensor 9 is applied to the A–D converter 13 as an analog signal, and the actual temperature $T_c$ detected by the temperature sensor 7 is also applied to the A–D converter 13 as an analog signal. These analog signals from sensors 7, 9, 10 are sequentially converted to the A–D converter 13 into binary signals respectively indicating the actual duct temperature $T_c$, the actual door opening angle $T_{po}$ and the actual ambient temperature $T_{am}$. These binary signals from A–D converter 13 are temporarily stored in RAM.

When CPU proceeds the computer program to a point 802, the actual and selected temperatures $T_r$, $T_{am}$, $T_c$ and $T_s$ are read out from RAM, and the constant K and coefficients $K_s$, $K_r$, $K_{am}$ and $K_c$ are also read out from ROM. Then, CPU serves to calculate an optimum opening angle $\theta$ of the air-blend door 6 from the equation (3) in relation to the readout values $T_r$, $T_{am}$, $T_c$, $T_s$, $K_s$, $K_r$, $K_{am}$, $K_c$ and K. Thereafter, at a point 803 CPU serves to calculate the product of the coefficient $K_{po}$ and actual door opening angle $T_{po}$ respectively read out from ROM and RAM and, in turn, subtracts the calculated door opening angle $\theta$ from the product $K_{po} \cdot T_{po}$ to produce one of the third and fourth output signals. Thus, the actuator 17 is controlled in response to one of the third and fourth output signals from CPU to adjust the actual door opening angle $T_{po}$ toward the optimum value $\theta$, as previously described.

When the computer program proceeds to a point 804, CPU calculates a rotational speed $V_a$ of blower 3 from the equation (4) in relation to the coefficient $K_{am}'$ read out from ROM and the actual and selected temperatures $T_{am}$, $T_r$ and $T_s$ read out from RAM. Then, at a point 805 CPU serves to produce a fifth output signal indicative of the calculated blower speed $V_a$ which is applied to the drive circuit 18. Thus, the drive circuit 18 acts to produce a drive signal in response to the fifth output signal from CPU to drive the blower 3 at the calculated rotational speed $V_a$, as previously described. This means that a quantity of air flow toward the evaporator 4 is defined by the rotational speed $V_a$ of blower 3.

When the computer program proceeds to a point 806, CPU discriminates as to whether or not the actual temperature $T_c$ is higher than or equal to the third predetermined value. If the actual temperature $T_c$ is lower than the third predetermined value, CPU acts to produce second and seventh output signals which are respectively applied to the drive circuit 16 and the actuator 19. Then, the compressor 12 is deactivated under control of the drive circuit 16 responsive to the second output signal from CPU, and the switch door 2 is switched over by the actuator 9 in response to the seventh output signal from CPU to open the second inlet 1b, as previously described. Thus, the air inside the passenger compartment is taken by the blower 3 through the second inlet 1b into the air duct 1 and flows through the evaporator 4 under deactivation of compressor 12, and finally flows into the passenger compartment through the sensor 7, air-blend door 6 and heater 5.

If the actual temperature $T_c$ is higher than or equal to the third predetermined value, CPU reads out the actual door opening angle $T_{po}$ and the reference angle respectively from RAM and ROM and discriminates whether or not the actual door opening angle $T_{po}$ is different from the reference angle. If the actual door opening angle $T_{po}$ accords with the reference angle, CPU acts to produce first and seventh output signals which are respectively applied to the drive circuit 16 and the actuator 19. In other words, if the actual in-car temperature $T_r$ becomes higher than the selected temperature $T_s$ after deactivation of the compressor 12 at the initial stage or in execution of the computer program at point 606 of the control routine 600, the opening angle of door 6 tends to become equal to the reference angle during execution of the control routine 800. When the CPU determines the fact that the detected temperature $T_c$ is higher than or equal to the third predetermined value and that the opening angle of door 6 is equal to the reference angle, the first output signal is issued from CPU. Then, the compressor 12 is activated under control of the drive circuit 16 responsive to the first output signal from CPU, and the switch door 2 is switched over by the actuator 19 in response to the seventh output signal from CPU to open the second inlet 1b, as previously described. Thus, the air inside the passenger compartment is taken by the blower 3 through the second inlet 1b into the air duct 1 and flows through the evaporator 4 under activation of the compressor 12, and in turn flows as the cooled air directly into the passenger compartment.

If the actual door opening angle $T_{po}$ is different from the reference angle, CPU produces a sixth output signal which is applied to and the actuator 19. Then, the switch door 2 is switched over by the actuator 19 in response to the sixth output signal from CPU to open the first inlet 1a, as previously described. Thus, the air outside the automobile is taken by the blower 3 through the first inlet 1a into the air duct 1 and flows through the evaporator 4, and finally flows into the compartment as the cooled air, as previously described.

From the above description, it should be understood that in the control routine 800, each calculation of an optimum door opening angle $\theta$ and a blower speed $V_a$ is performed together with discrimination of the position of switch door 2 to direct the actual in-car temperature $T_r$ toward the selected value $T_s$.

Figure 4:
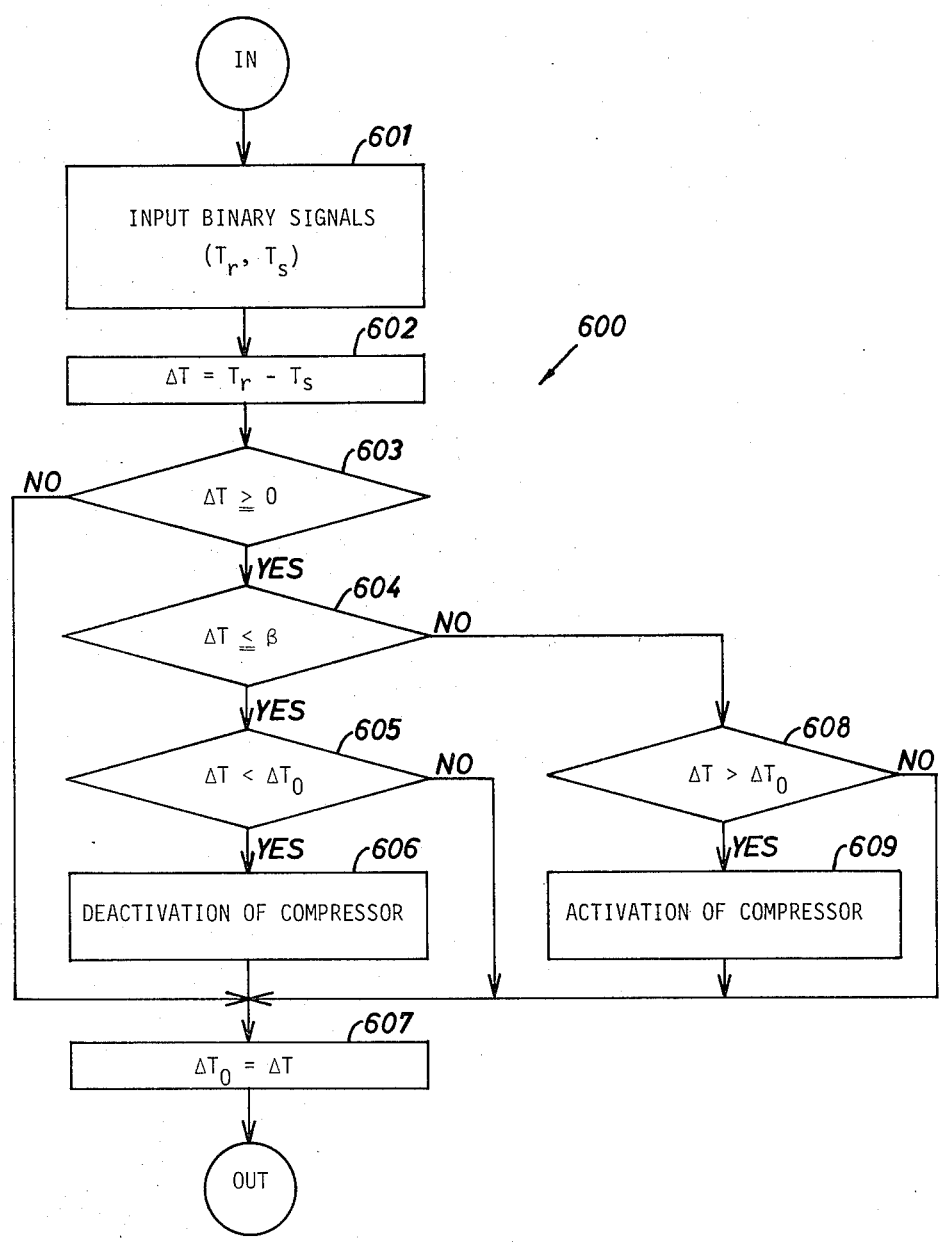

When the timer data C becomes zero after the execution from point 400 to routine 800 through the point 500 is repetitively performed within thirty seconds to make the zero, CPU determines as "yes" at the above point 500 to proceed the computer program to a routine 600 for control of the compressor 12, as shown in FIGS. 2 and 4. Then, at a point 601 the actual and selected temperatures $T_r$ and $T_s$ respectively from the sensor 8 and selector 11 are temporarily stored in RAM, as previously described, and at a point 602 a second deviation $\Delta T$ is calculated from the equation (5) in relation to the selected and actual temperatures $T_s$ and $T_r$ from RAM. When the computer program proceeds to a point 603, CPU discriminates as to whether or not the calculated second deviation $\Delta T$ is larger than or equal to zero.

If CPU determines as "yes" at point 603, it proceeds the computer program to a point 604 to discriminate as to whether or not the calculated second deviation $\Delta T$ is smaller than or equal to the fourth predetermined value $\beta$ read out from ROM. If the discrimination at point 604 is "yes", CPU proceeds the program to a point 605 to discriminate whether or not the calculated second deviation $\Delta T$ is smaller than the calculated first deviation $\Delta T_0$. This means that at point 605 CPU discriminates whether the actual deviation between the actual and selected in-car temperatures tends to decrease or not. If CPU determines as "yes" at point 605, it proceeds the computer program to a point 606 to produce a second output signal. Thus, the compressor 12 is deactivated by the drive circuit 16 in response to the second output signal from CPU, as previously described.

If CPU determines as "no" at the above point 604, it proceeds the program to a point 608 to discriminate whether or not the calculated second deviation $\Delta T$ is larger than the calculated first deviation $\Delta T_0$. This means that at point 608 CPU discriminates whether the actual deviation between the actual and selected temperatures tends to decrease or not. If CPU determines as "yes" at point 608, it proceeds the program to a point 609 to produce a first output signal.

Thus, the compressor 12 is continuously activated by the drive circuit 16 in response to the first output signal from CPU, as previously described. When the computer program proceeds to a point 607 from one of points 606, 609, the calculated second deviation $\Delta T$ is set by CPU as a new first deviation $\Delta T_0$. If CPU determines as "no" at one of the above-noted points 603, 605 and 608, it proceeds the program to point 607 to conduct setting of the calculated second deviation $\Delta T$ as a new first deviation $\Delta T_0$. Thereafter, the timer data C is again set by CPU in RAM at a point 700 to return the computer program to point 400.

From the above description, it will be understood that after completion of the initial setting routine 300, the execution of the control routine 800 is repetitively conducted within each period of time of thirty seconds to adjust the actual in-car temperature $T_r$ toward the selected value $T_s$ and also that after each execution of the control routine 800, the execution of the control routine 600 is repetitively conducted at each lapse of thirty seconds to control operation of compressor 12 and to maintain the actual in-car temperature $T_r$ in the selected value $T_s$.

Assuming that in summer the main switch is actuated during travelling of the automobile to cool the air in the passenger compartment down to a desired temperature $T_s$, the electric control apparatus is conditioned in its operation to initiate execution of the predetermined program in the computer 14. At this stage, it is assumed that the actual temperature $T_r$ of the air in the compartment is very much higher than the desired value $T_s$. When the computer program proceeds to the point 302 of initial setting routine 300, as previously described, CPU calculates a first deviation $\Delta T_0$ in relation to the actual and desired temperatures $T_r$ and $T_s$ to perform discrimination at point 303. Then, CPU determines as "yes" at this point 303, as understood from the above description, and proceeds the program to point 305 to produce a first output signal for activating the compressor 12, as previously described. Thus, the evaporator 4 cooperates with the compressor 12 to cool the air flow therethrough to direct the actual temperature in the compartment toward the desired value $T_s$.

After completing execution at point 305, CPU repetitively proceeds the computer program to the control routine 800, as previously described, to determine the minimum opening angle of air-blend door 6 and the maximum speed of blower 3 and also to conduct introduction of the inside air through the switch door 2 into the air duct 1. This means that the air conditioner serves to adjust the actual in-car temperature toward the desired value at its maximum cooling ability.

When CPU determines as "yes" at point 500, as previously described, it proceeds the computer program to the control routine 600 in which a second deviation $\Delta T$ is calculated at point 602 to conduct discrimination at point 604. If the calculated second deviation $\Delta T$ is larger than the fourth predetermined value $\beta$ at this stage, the discrimination at point 604 is determined as "no" by CPU to execute discrimination at point 608. At this point 608, CPU serves to determine as "no" because the actual deviation between the actual and desired in-car temperatures tends to decrease due to control of the air conditioner at the maximum cooling ability. Then, CPU serves to set the calculated second deviation $\Delta T$ as a new first deviation $\Delta T_0$ at point 607 to return the program to point 400.

When the repetitive executions through the control routines 600 and 800 are continued in a few minutes to make a second deviation $\Delta T$ smaller than or equal to the fourth predetermined value $\beta$, CPU serves to determine as "yes" at the point 604 of control routine 600 so as to proceed the computer program to point 605. The, CPU determines as "yes" at point 605 because of the continuous cooling-down by the air conditioner and produces a second output signal at point 606 for deactivating the compressor 12, as previously described. Thereafter, execution through the control routine 800 or 600 is repetitively performed under deactivation of compressor 12 such that the actual opening angle of air-blend door 6 is decreased in relation to rise of the actual cooled temperature $T_c$ to avoid rise of the actual in-car temperature $T_r$ over the fourth predetermined value $\beta$.

If a second deviation $\Delta T$ exceeds the fourth predetermined value $\beta$ during the above-noted repetitive executions, CPU determines as "no" at point 604 and proceeds the computer program to point 608. If at this stage CPU serves to determine as "yes", it produces a first output signal at point 609 to activate the compressor 12, as previously described. Thereafter, the computer program is returned to point 400 so that execution of the control routine 800 is repetitively performed under activation of compressor 12 to cool down the air flow through the evaporator 4. Thus, the actual door opening angle is increased due to repetitive executions through points 802, 803 and the switch door 2 is switched over due to repetitive executions through point 806, thereby to direct the actual in-car temperature $T_r$ toward the desired value $T_s$ without sudden change of the actual in-car temperature $T_r$. Thereafter, operation of the compressor 12 is properly controlled in relation to first and second deviations $\Delta T_O$ and $\Delta T$ and the fourth predetermined value $\beta$ to adjust the actual in-car temperature $T_r$ toward the desired value $T_s$ and to precisely save surplus cooling ability of the air conditioner.

In case the air conditioner is operated by the electric control apparatus in spring or autumn, deactivated time interval of the compressor 12 becomes relatively longer than that in summer because ambient temperature outside the automobile is relatively lower than that in summer. This serves to further facilitate saving of surplus cooling ability of the compressor 12. In case the air conditioner is also operated by the electric control apparatus in winter, activation of the compressor 12 is hardly conducted because a second deviation $\Delta T$ may not become larger than the fourth predetermined value $\beta$.

For practice of the present invention, the first and fourth predetermined values $\alpha$, $\beta$ and the timer data C may be altered in accordance with various types of automobiles. In this case, the computer program may be modified, for example, as another one in which discrimination at point 604 is performed as "yes" when $\Delta T \leq 0.5°$ C. and also performed as "no" when $\Delta T > 0.1°$ C. In this modification, $\Delta T < \Delta T_O$ and $\Delta T > \Delta T_O$ are also respectively changed into $\Delta T \leq \Delta T_O$ and $\Delta T \geq \Delta T_O$.

Although in the above embodiment the temperature sensor 7 is provided such that the actual door opening angle is compensated to avoid sudden changes of the actual in-car temperature, a modification of the predetermined program is adapted to eliminate the temperature sensor 7. In this case, the modified program is stored in ROM such that upon completion of execution at point 606, CPU serves to alter a previously calculated optimum door opening angle in consideration with a predetermined angle $\Delta \theta$ so as to conduct the compensation of the actual door opening angle.

While in the above embodiment cooling ability of the air conditioner is adjusted in relation to activation and deactivation of the compressor 12, it may be also adjusted in relation to capacity control of the compressor 12 which is caused by an appropriate device of a conventional type. In this case, suitable electronic circuits may be replaced with the computer 14 to ensure the abovenoted operations of the air conditioner.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control method for an automobile air conditioner including a sensor for sensing an actual temperature within a passenger compartment of a vehicle, a temperature control means for selecting a desired passenger compartment temperature and cooling means responsive to the actual and desired temperatures for adjusting the passenger compartment temperature to the desired temperature, the control method comprising the steps of:

(a) detecting an actual passenger compartment temperature;

(b) determining a selected temperature from said temperature control means;

(c) determining a deviation between the actual passenger compartment temperature and the selected temperature;

(d) repeating steps (a), (b) and (c) upon each lapse of a predetermined period of time;

(e) comparing a current determined deviation with a predetermined first positive value and activating said cooling means when the determined deviation is larger than said first value;

(f) comparing the current determined deviation with a previously determined deviation when the determined deviation is smaller than or equal to said first value;

(g) deactivating said cooling means when the current detected deviation is smaller than the previously detected deviation;

(h) maintaining said cooling means in its activated or deactivated condition when the current detected deviation is larger than the previously detected deviation; and (i) activating said cooling means when the current detected deviation is larger than each of said first value and said previously detected deviation.

2. A method according to claim 1, further comprising the step of:

maintaining said cooling means in its deactivated condition when the actual in-car temperature is below the selected temperature and wherein the step of comparing the detected deviation with said predetermined positive value is carried out when the actual in-car temperature is higher than the selected temperature.

3. A method according to claim 1 or 2, wherein said step of comparing with a first positive value comprises the step of comparing with a first positive value that is essentially equal to 0.5° C.

4. A method according to claim 1 or 2, wherein said predetermined period of time is substantially thirty seconds.

5. A method according to claim 1 or 2, further comprising the steps of:

detecting the temperature of air cooled by said cooling means; and deactivating said cooling means when the detected temperature of the air becomes less than a second predetermined value.

6. An electric control apparatus for an automobile air conditioner including cooling means arranged to be operated in response to an actual passenger compartment temperature, and a desired temperature selected by manipulation of a temperature control means, the control apparatus comprising:

a sensor for detecting an actual passenger compartment temperature to produce a first electric signal indicative of the actual passenger compartment temperature;

a temperature selector adapted to be manipulated by a user for selecting a desired temperature and providing a second electric signal indicative of a desired passenger compartment temperature;

computer means for (a) calculating a current deviation between values of said first and second electric signals upon each lapse of a predetermined period of time, (b) comparing the current calculated deviation with a predetermined positive value to produce a first output signal therefrom when the calculated deviation is larger than said predetermined positive value, (c) comparing the current calculated deviation with the previously calculated deviation when the current calculated deviation is smaller than or equal to said predetermined positive value; (d) producing a second output signal therefrom when the current calculated deviation is smaller than the previously calculated deviation; (e) maintaining said cooling means in its activated or deactivated condition when the current calculated deviation is larger than the previously calculated deviation; and (f) producing a third output signal therefrom when the current calculated deviation is larger than both said predetermined positive value and said previously calculated deviation; and means for activating said cooling means in response to each of said first and third output signals and for deactivating said cooling means in response to said second output signal from said computer means.

7. An electric control apparatus for an automobile air conditioner including an evaporator assembled within an air duct of said conditioner, a compressor for supplying compressed refrigerant medium to said evaporator when operated in an activated condition, and a temperature control means for selecting a desired passenger compartment temperature, the control apparatus comprising:

a sensor for detecting the actual passenger compartment temperature and producing a first electric signal indicative of said actual temperature;

a temperature selector adapted to be manipulated by a user for selecting a desired temperature and providing a second electric signal indicative of said desired temperature;

computer means for (a) calculating a current deviation between values of said first and second electric signals upon each lapse of a predetermined period of time, (b) comparing the current calculated deviation with a predetermined positive value to produce a first output signal therefrom when the current calculated deviation is larger than said predetermined positive value, (c) comparing the current calculated deviation with the previously calculated deviation when the calculated deviation is smaller than or equal to said predetermined positive value, (d) producing a second output signal therefrom when the current calculated deviation is smaller than the previously calculated deviation, (e) maintaining said cooling means in its activated or deactivated condition when the current calculated deviation is larger than the previously calculated deviation, and (f) producing a third output signal therefrom when the current calculated deviation is larger than both said predetermined positive value and said previously calculated deviation; and means for activating said compressor in response to each of said first and third output signals and for deactivating said compressor in response to said second output signal from said computer means.

8. An electric control apparatus for an automobile air conditioner including cooling means arranged to be operated in accordance with an actual passenger compartment temperature and a temperature control means for adjusting the actual in-car temperature to a desired value by controlling the cooling ability of said cooling means, the control apparatus comprising:

- a sensor for detecting an actual passenger compartment temperature and producing a first electric signal indicative of the actual temperature;
- a temperature selector adapted to be manipulated by a user for selecting a desired temperature and providing a second electric signal indicative of said desired value;
- computer means for (a) calaculating a current deviation between values of said first and second electric signals upon each lapse of a predetermined period of time; (b) comparing the current calculated deviation with a predetermined positive value to produce a first output signal therefrom when the current calculated deviation is larger than said predetermined positive value, (c) comparing the current calculated deviation with the previously calculated deviation when the calculated deviation is smaller than or equal to said predetermined positive value, (d) producing a second output signal therefrom when the current calculated deviation is smaller than the previously calculated deviation, (e) maintaining the cooling ability of said cooling means in its increased or decreased condition when the current calculated deviation is larger than the previously calculated deviation, and (f) producing a third output signal therefrom when the current calculated deviation is larger than both said predetermined positive value and said previously calculated deviation; and
- means for increasing the cooling ability of said cooling means in response to each of said first and third output signals and for decreasing the cooling ability of said cooling means in response to said second output signal from said computer means.

* * * * *